(12) United States Patent
Bhati et al.

(10) Patent No.: US 11,890,960 B1
(45) Date of Patent: Feb. 6, 2024

(54) INTERFACE BASED ELECTRICAL LOAD MANAGEMENT

(71) Applicant: Rivian IP Holdings, LLC, Plymouth, MI (US)

(72) Inventors: Jaivardhan S. Bhati, Oakland, CA (US); Lingxiao Ma, Burbank, CA (US); Siqing Lee, Fremont, CA (US); Cecilia An Zhou, San Francisco, CA (US); Yixin Cao, Cupertino, CA (US); Bryan Duc Duong, San Jose, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 18/183,193

(22) Filed: Mar. 14, 2023

Related U.S. Application Data

(60) Provisional application No. 63/477,722, filed on Dec. 29, 2022.

(51) Int. Cl.
*B60L 53/67* (2019.01)
*G05B 19/042* (2006.01)
*B60L 53/63* (2019.01)

(52) U.S. Cl.
CPC ............... *B60L 53/67* (2019.02); *B60L 53/63* (2019.02); *G05B 19/042* (2013.01); *G05B 2219/2639* (2013.01)

(58) Field of Classification Search
CPC .................................. B60L 53/67; B60L 53/63
USPC ........................................................... 700/295
See application file for complete search history.

(56) References Cited

U.S. PATENT DOCUMENTS

| | | | |
|---|---|---|---|
| 2019/0359077 A1* | 11/2019 | Beez | B60L 53/63 |
| 2020/0122585 A1* | 4/2020 | Bhat | G05B 19/0426 |
| 2021/0083506 A1* | 3/2021 | Rao | G01R 21/06 |
| 2022/0216728 A1* | 7/2022 | Ashman | G01R 22/063 |
| 2022/0258637 A1* | 8/2022 | Chow | B60L 53/66 |
| 2022/0396168 A1* | 12/2022 | Jefferies | H02J 3/26 |
| 2023/0120740 A1* | 4/2023 | Lewchuk | B60L 53/54 |
| | | | 320/109 |

* cited by examiner

*Primary Examiner* — Md Azad
(74) *Attorney, Agent, or Firm* — Foley & Lardner LLP

(57) ABSTRACT

Configuring chargers at a charging site is provided. A data processing system can include a processor coupled with memory and configured to identify a configuration. The configuration can indicate a plurality of chargers coupled with a first line of an electrical panel to conduct power at a first phase and a second line of the electrical panel to conduct power at a second phase different than the first phase. The one or more processors can cause, based on the configuration and operational characteristics associated with one or more of the plurality of chargers, a controller to deliver power to a charger of the plurality of chargers via the first line and the second line based on the power capacity of the electrical panel.

20 Claims, 6 Drawing Sheets

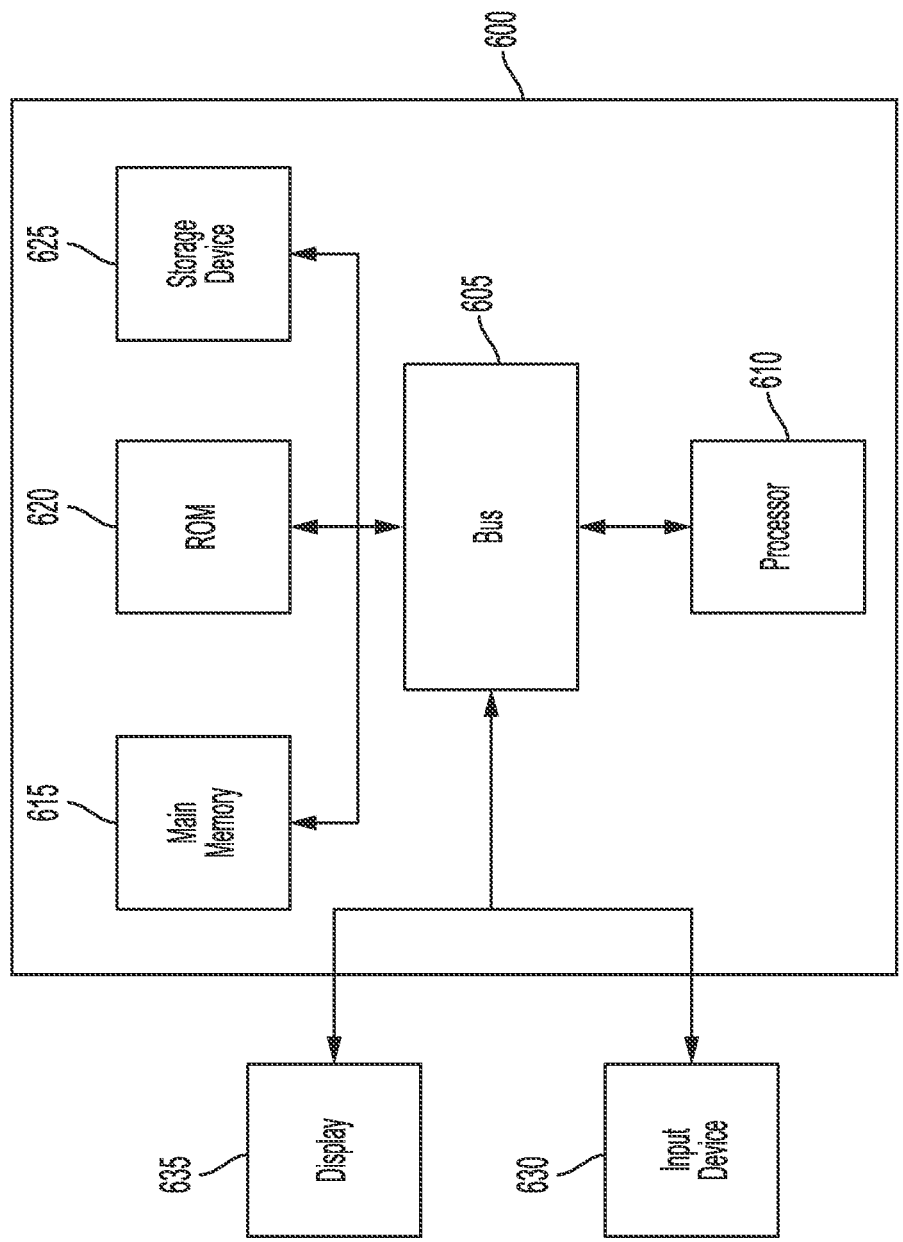

INTERFACE BASED ELECTRICAL LOAD MANAGEMENT

CROSS-REFERENCE TO RELATED APPLICATIONS

This application claims priority to U.S. Provisional Application Ser. No. 63/477,722 filed Dec. 29, 2022, which is incorporated by reference in its entirety.

INTRODUCTION

Electric vehicles (EVs) can be powered using chargers located at charging sites.

SUMMARY

This technical solution is generally directed to interface-based electrical load management. For example, the technology can be directed to configuring EV chargers or an electrical panel at a charging site to which the EV chargers are connected. The technology can configure the EV chargers or the electrical panel to allow the EV chargers to operate at their individual maximum power levels when the maximum power capacity of the panel is not exceeded. When configuring an EV charging site with chargers for bidirectional powering of EVs, multiple chargers can share the same phase lines of the panel. The phase lines (as well as the panel) can have their own maximum power capacities that can limit the total power throughput of the chargers to which they are connected. Each charger can have its individual power capacity and the site can include a number of such chargers which, if operated simultaneously, can exceed the power capacity of the phase lines (e.g., the panel). As a result, it can be difficult to provide a large number of chargers at a charging site without placing additional limitations on the individual power capacities of the chargers, to ensure that the panel is not overburdened. The present solution can overcome at least these challenges by providing a configuration for power or load balancing of the chargers at a charging site to allow each of the individual chargers to operate at their individual maximum power capacities when the combined throughout at the shared phase lines (e.g., the panel) is not exceeded.

An aspect can be directed to a system. The system can include one or more processors coupled with memory. The one or more processors can identify a configuration. The configuration can indicate a plurality of chargers coupled with a first line of an electrical panel to conduct power at a first phase. The one or more processors can identify a second line of the electrical panel to conduct power at a second phase. The second phase can be different than the first phase. The one or more processors can identify a power capacity of the electrical panel. The one or more processors can provide, for display via a graphical user interface, a representation of the configuration. The one or more processors can validate, responsive to an input, the representation of the configuration to cause a controller to deliver power to a charger of the plurality of chargers via the first line and the second line based on the power capacity of the electrical panel.

An aspect can be directed to a method. The method can include identifying, by a data processing system, the configuration indicating a power capacity of an electrical panel and a plurality of chargers coupled with a first line of the electrical panel to conduct power at a first phase and a second line of the electrical panel to conduct power at a second phase different than the first phase. The method can include causing, based on the configuration and operational characteristics associated with one or more of the plurality of chargers, a controller to deliver power to a charger of the plurality of chargers via the first line or the second line based on the power capacity of the electrical panel.

An aspect of the present disclosure can be directed to a non-transitory computer-readable media having processor readable instructions. When executed, the instructions can cause a processor to identify the configuration indicating a power capacity of an electrical panel and a plurality of chargers coupled with a first line of the electrical panel to conduct power at a first phase and a second line of the electrical panel to conduct power at a second phase different than the first phase. The instructions can cause the processor to provide, for display via a graphical user interface, a representation of the configuration. The instructions can cause the processor to receive an input corresponding to the configuration. The instructions can cause the processor to validate, responsive to the input, the representation of the configuration to cause a controller to deliver power to a charger of the plurality of chargers via the first line and the second line based on the power capacity of the electrical panel.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 is a block diagram illustrating an architecture for a computer system that can be employed to implement elements of the systems and methods described and illustrated herein.

DETAILED DESCRIPTION

Figure 1:
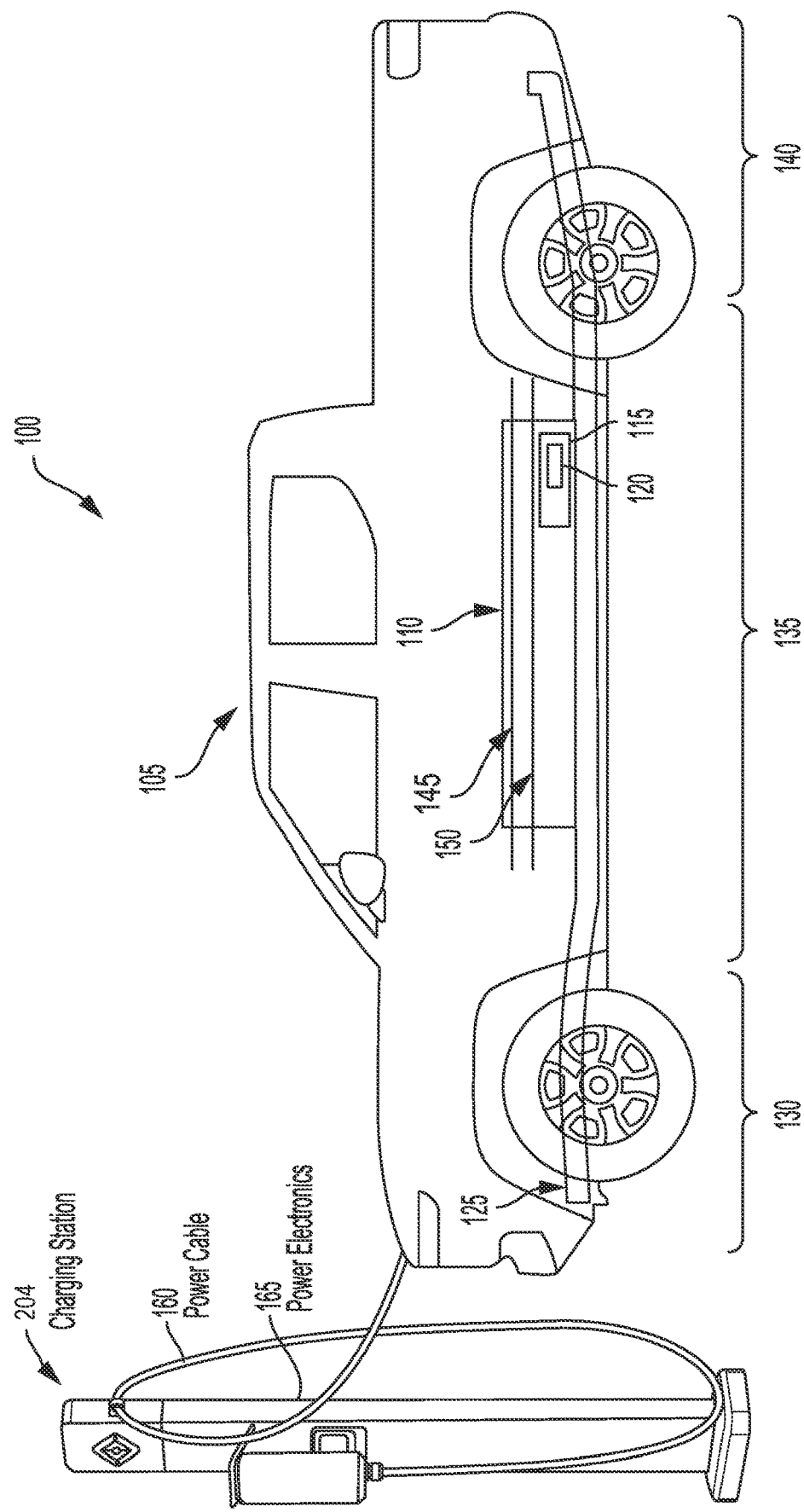
FIG. 1 depicts an example electric vehicle connected to a charging station.

Following below are more detailed descriptions of various concepts related to, and implementations of, methods, apparatuses, and systems of configuring chargers or panels at a charging site. The various concepts introduced above and discussed in greater detail below may be implemented in any of numerous ways.

The present disclosure is directed to a configuration for a load management solution for EV chargers sharing the same phase lines of an electrical panel by which the chargers can have their power load balanced such that each charger can be operated at increased power levels so long as the total power throughput of all chargers connected to the same panel remains below the power capacity. When configuring a site with chargers for bidirectional powering of EVs, multiple chargers can be connected to the same electrical phase lines. The phase lines or the panel itself can have their maximum power capacities that can limit the maximum power throughput that the panel can provide. Meanwhile, each charger at the site can have its own maximum power capacity, which when combined with the power capacities of other chargers can result in a total power throughput that exceeds the maximum power capacity of the phase lines or the panel. While lowering the individual power capacities of the chargers can help avoid overburdening the electrical panel, doing so can also make it difficult to operate the individual chargers at the site at their maximum power potentials. As a result, it can be challenging to use the full potential (e.g., maximum power throughput) of the chargers at a site in which the combined power capacities of the chargers exceeds the power capacity of the panel (and/or the phase lines), thereby resulting in prolonged EV charge times which adversely affects user experience.

The present solution can overcome at least these challenges by providing graphical user interface-based configuration of the charging site that allow a user to select a power/load balancing setting by which individual chargers at the site can operate at their individual maximum power capacities when the combined throughput of all active chargers does not exceed the power capacity of the panel. The present solution allows for a user to utilize a user interface via which a user can indicate, input or validate a configuration for the chargers at the site. The configuration can refer to or include indicating which chargers are connected to which phase lines or switches of the electrical panel. The configuration can utilize settings (e.g., rules or policies) for power/load balancing of the individual chargers. The validated configuration can cause the power controllers to power/load balance the chargers at the site in accordance with the validated configuration, ensuring that the chargers can operate at their individual maximum power capacities provided that the maximum power capacity of the panel (and/or the phase lines) is not exceeded. Since charging or discharging EVs at lower power levels can slow the charge rate and prolong the charge time, diminishing the user experience, the present solution improves the user experience by allowing individual chargers to operate at their maximum power capacity (e.g., higher power levels) when the panel capacity is not exceeded.

FIG. 1 depicts an example cross-sectional view 100 of an electric vehicle 105 coupled to a charging station 204 comprising power electronics 165 to charge a battery of an electric vehicle 105 via a power cable 160. Electric vehicle 105 can include at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Power electronics 165 can include any component, part, subsystem or system of the charger 204, also referred to as the charging station 204 or CS 204. Power electronics 165 can be used to provide charging or discharging services to EVs 105. Power electronics 165 can include circuits, components or parts providing power to EVs 105 or receiving power from EVs 105. Power electronics 165 can include one or more control boxes, including power circuitry, control electronics, controllers and circuits for managing power or communication between a CS 204 and an EV 105 via a power cable 160. Power electronics 165 can include any analog and digital circuitry, including for example, AC-DC converters, DC-DC converters, DC-AC converters, any combination of power transistors, capacitors, inductors, resistors, diodes, switches, transformers, relays and other electrical or electronic components to form structures, such as half and full bridge circuits, rectifiers, filters, multifunction circuits, single or multi-stage chargers with resonant half-bridge converts utilizing one or more inductors and one or more capacitors, such as the LLC converters and single or multi-directional DC-DC converters. Power electronics 165 can be controller or managed by processors, such as processors 610. Power electronics 165 can include or be connected to memory, such as 615, 620 or 625, which can store scripts, computer code or instructions to be accessed or executed by electronic microcontrollers or devices, such as processors 610. Power electronics 165 can include one or more energy storage systems, including batteries for storing energy, as well as circuitry for interfacing with the electrical grid (e.g., via the panel 210).

Power cable 160, also referred to as the power cord 160, can be attached to or coupled with power electronics 165 of a charger 204. Power cable 160 can include one or more electrical conductor wires or lines, including lines or wires for high power throughput as well as electronic or electrical signals. Power cable 160 can include or be connected to a power plug for plugging into an EV 105 and can include wires or lines for conducting high power, high voltage or high current between EV 105 and CS 204. Power cable 160 can include one or more wires or lines for conducting analog or digital communication signals between the EV 105 and CS 204. Power cable 160 can facilitate or provide a conduit or path for exchange of communication between EV 105 and a charger 204 and for exchange of power (e.g., electricity) between EV 105 and the charger.

Figure 2:
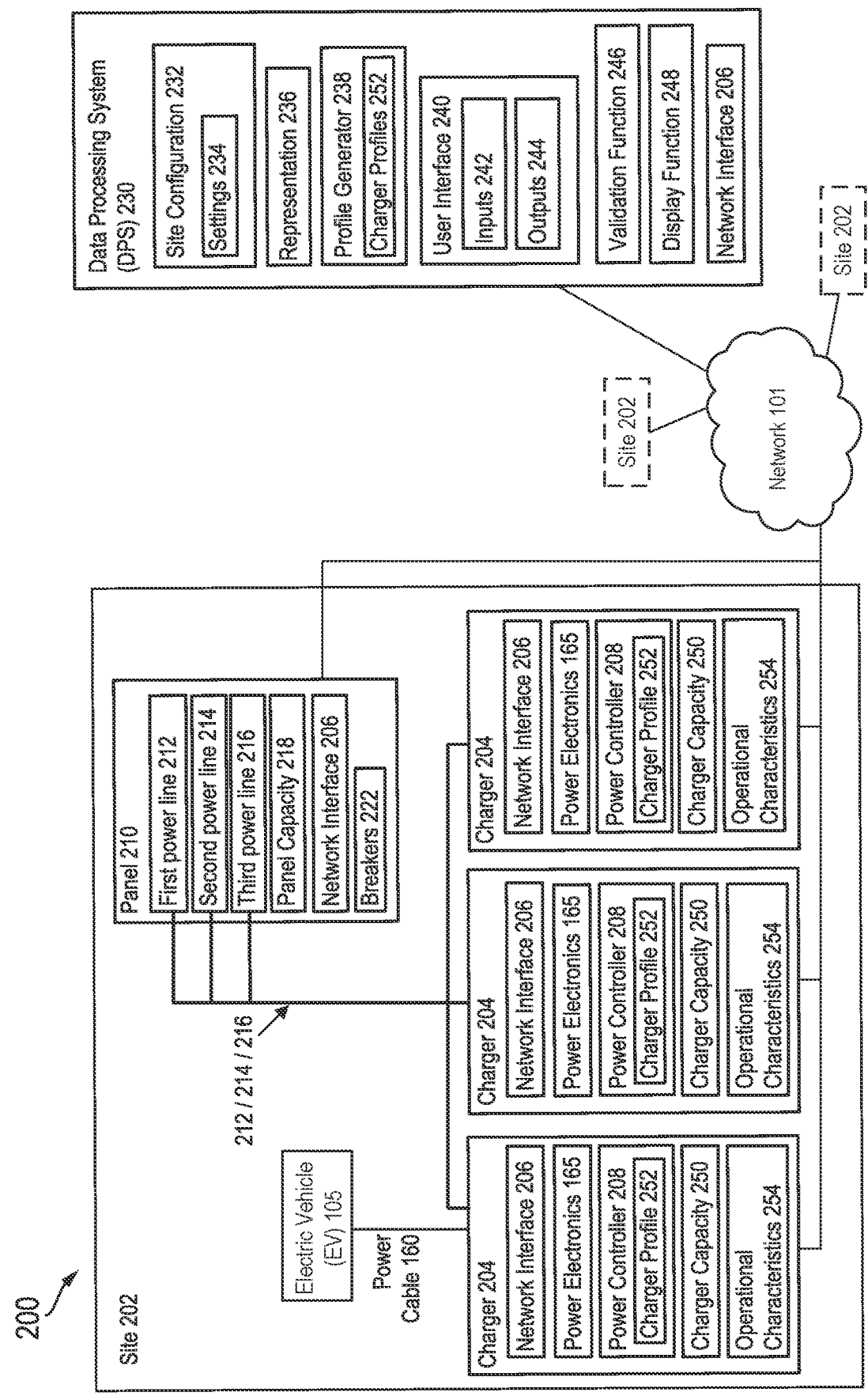
FIG. 2 depicts a block diagram of a system for configuring chargers connected to a panel.

FIG. 2 depicts an example system 200 for a configuration for load management of chargers (e.g., EV chargers) at a charging site. FIG. 2 depicts one or more charging sites 202, where each site 202 can include a plurality of plurality of chargers 204 and one or more panels 210. Each charger 204 can be electrically coupled (e.g., connected for directional or bidirectional power exchange) with one or more EVs 105 via power cables 160. Each charger 204 can include a network interface 206, power electronics 165, a charger capacity 250, operational characteristics 254 and a power controller 208 having a charger profile 252 of that charger 204. Each panel 210 can include multiple power lines, such as a first power line 212, a second power line 214 and a third power line 216. Panel 210 can also include one or more panel capacities 218, network interfaces 206 and breakers 222. The panel 210 and the chargers 204 can each be communicatively coupled with a data processing system (DPS) 230 via a network 101. A DPS 230 can include one or more site configurations 232, representations 236, profile generators 238, user interfaces 240, validation functions 246, display functions 248, and network interfaces 206. Each site configuration 232 can include one or more settings 234. Each profile generator 238 can include one or more charger profiles 252. Each user interface 240 can include inputs 242 and outputs 244.

The system 200 can be directed to a solution in which a cloud or network based configuration 232, established or generated using a DPS 230, can provide power distribution or load balancing to chargers 204 at an EV charging site 202 based on user selected settings 234, based on which charger profiles 252 can be generated. The configuration 232 that can allow chargers 204 to operate in accordance with their charger profiles 252. The charger profiles 252 can configure the chargers 204 to operate at their individual maximum charger capacities 250 (or at offsets from the charger capacities 250) provided that the panel capacity 218 is not exceeded by the chargers 204 operating simultaneously. DPS 230 can distribute power across the chargers 204 in accordance with settings 234 that can consider, or be based on, operational characteristics 254 of the chargers 254

A site 202 can include any location in which chargers 204 and/or panel 210 are disposed, deployed or located. Site 202 can include an EV charging site having any number of chargers 204 for EV 105 users. Site 202 can include any number of chargers 204 connected to a panel 210. For example, site 202 can include a location with chargers 204 having charger capacities 250, which when combined (e.g., added), can exceed the panel capacity 218 of the panel 210. As such, site 202 can include chargers 204 which may not be able to operate simultaneously at their charger capacities 250, given the panel capacity 218 limitation.

Charger 204, also referred to as the charging station 204, or a CS 204, can include any combination of hardware and software for providing electricity or otherwise electrically charging or discharging one or more batteries of one or more EVs 105. CS 204 can be a bidirectional charging station that can include any combination of hardware and software for providing power to or drawing power from one or more batteries of the EV 105, such as the battery packs 110, battery modules 115 or battery cells 120. CS 204 can include scripts, functions and computer code stored in memory and executed or operating on one or more processors to implement any functionality of the CS 204. For example, CS 204 can include a computer system 600 having one or more processors 610 and memories 615, 620 and 625, each of which can store computer code, scripts, functions and instructions to implement functionality of CS 204.

Charger 204 can be a single phase charger or a three phase charger. For example, charger 204 can be electrically coupled to one of the power lines 212, 214 or 216 and ground of the panel 210. For example, charger 204 can be electrically coupled with three power lines 212, 214 and 216 and the ground line of the panel 210. Charger 204 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. CS 204 can include electric vehicle charging equipment that can include a power and control box and power cord or a cable 160. CS 204 can include circuitry for converting alternating current (AC) to direct current (DC), such as an AC-DC converter. CS 204 can include DC-AC converters or DC-DC converters.

Charger 204 can be configured to couple with one or more EVs 105 at the same time. A charger 204 can be electrically coupled with multiple power lines 212, 214 and/or 216 and can have multiple power cables 160 to couple with multiple EVs 105. For example, a charger 204 can be connected to two power lines (e.g., 212 or 214) of an EV 105 and also be connected to a common or a ground of the panel 210. Charger 204 can then provide charging to a first EV 105 via a first of the power lines (e.g., 212 or 214) and a ground while also providing charging to a second EV 105 via a second one of the power lines (e.g., remaining one of the 212 or 214) and/or the ground.

Charger 204 can be electrically coupled to an electrical grid via a panel 210 and can draw electricity from the grid, via the panel 210, in order to charge EVs 105 or receive electricity from the EV batteries (e.g., 110, 115 or 120). Multiple chargers 204 can be electrically coupled with the same one or more phases of the panel 210, such as the first power line 212 operating at a first phase, a second power line 214 operating at a second phase and/or a third power line 216 operating at a third phase 316. Charger 204 can be set to operate, such as provide or draw electricity, at any maximum charger capacity 250, which can correspond to the maximum operating voltage, current or power levels, such as for example levels rated for chargers that are rated level-1, level-2 or level-3. For example, CS 204 can provide electricity to EVs 105 or draw power from EVs 105 at a maximum operating charger capacity 250 at any voltage level, such as 220V, 208-240V or 400-900V. Similarly, CS 204 can provide electricity to EVs 105 or draw electricity from EVs 105 in accordance with any chargers capacity 250. For example, charger 204 can operate at charger capacities 250 corresponding to level 1, level 2 or level 3 chargers, which can cover or correspond to any power output levels between about 5 kW and 800 kW, such as for example: 5 kW, 10 kW, 20 kW, 30 kW, 50 kW, 80 kW, 100 kW, 150 kW, 120, 650 kW, 700 kW, 350 kW, 700 kW, 700 kW, 800 kW or more.

For example, a level 1 charger 204 can be configured to provide services at level 1 charger capacity 250, which can correspond to about 110-120V, about 1.3 kW to 2.4 kW, and/or about 10 A to 20 A of current range. For example, a charger 204 can have the charger capacity set in accordance with a level 2 rated charger 204, operating at around 208V-240V, about 3 kW to 19 kW range, and about 12 A to 90 A of current range. For example, a charger 204 can have the charger capacity 250 set in accordance with level 3 rated charger 204, operating at around 400V-900V and about 50 kW to 350 kW, which can correspond to about 55 A to 875 A of current range.

Chargers 204 can be set or configured to operate at a maximum power, voltage or current level that is offset from the set charger capacity 250. For example, a charger 204 can be configured to operate at an offset power below that is a particular amount of power below the charger capacity 250, such as for example, 20% of the maximum charger capacity 250 below the charger capacity 250. For example, a charger 204 having a charger capacity 250 set at 2 kW can have its maximum operating power set at about 1.6 kW, which is about 20% of the charger capacity 250 power below the charger capacity 250. Likewise, the offset from the charger capacity 250 can be set at 10% below the charger capacity 250 (e.g., 1.8 kW) or any other offset amount. Chargers 204 can communicate the rated levels (e.g., charger capacities 250) via network interfaces 206, such as via a network 101 and with the DPS 230 or panel 210.

Network interface 206 can include any combination of hardware and software for communicating via a network 101. Network interface 206 can include scripts, functions and computer code stored in memory and executed or operating on one or more processors (e.g., 610) to implement any network interfacing, such as network communication via a network 101. Network 101 can include any wired or wireless network, a world wide web, a local area network, a wide area network, a Wi-Fi network, a Bluetooth network or any other communication network or platform. Network interface 206 can include functionality for communicating, via network 101, using any network communication protocol such as Transmission Control Protocol (TCP)/Internet Protocol (IP), user datagram protocol (UDP), or any other communication protocol used for communicating over a network 101. Network interface 206 can include communication ports and hardware for receiving and sending data and messages over the network 101 or via a power cable 160. Network interface 206 can include the functionality to encode and decode, send and receive any information, commands, instructions, data structures, values or other data between the EV 105 and CS 204.

Power controller 208 can include any combination of hardware and software for controlling or managing charge or amount of power provided to EV 105. Power controller 208 can include scripts, functions and computer code stored in memory and executed or operating on one or more processors to implement any functionality of the power controller 208. Power controller 208 can include a digital signal processor (DSP), a microcontroller or one or more integrated circuits programmed to implement the controller 208 functionality. Power controller 208 can set, control or monitor a rate of charge to provide to EV 105 or draw from an EV 105. Power controller 208 can set or monitor a power level, a voltage level or a current level for a charge event. Power controller 208 can utilize charger profiles 252 from the DPS 230 to provide a set amount of power throughput (e.g., in either direction) which can be implemented in accordance with settings 234 of the site configuration 232.

Power controller 208 can maintain power input or output, to or from the charger 204, in accordance with the charger profiles 252, thereby implementing the settings 234 (e.g., site operating policies) for the site 202, as dictated by the configuration 232 or representation 236. For example, power controller 208 can operate a charger 204 in accordance with particular policies or rules, that can include or be derived, determined or established based on settings 234. Power controller 208 can utilize a charger profile 252 to set the operating power level of the charger 204, such as a maximum charger capacity 250 when the configuration 232 dictates so, or at a power level that is lower than the maximum charger capacity (e.g., in accordance with the configuration 232 and/or settings 234).

Power controller 208 can be deployed on a charger 204 or on a panel 210. For example, power controller 208 on a panel 210 can user phase mapping information to manage electrical load delivered to the chargers 204 using different power lines 212, 214, 214 operating at different phases 312, 314 and 316. For example, chargers 204 can be configured to receive maximum current available, such that the sum of the sum of the maximum currents from each of the chargers 204 can exceed the panel capacity 218 for a phase at the panel. In such instances, the power controller 208 at the panel 210 can monitor the number of chargers 204 connected to the particular power line (e.g., phase line) as well as the amount of power that they are drawing in order to throttle the amount of power delivered via those power line to prevent the breaker 222 for the particular power line (e.g., phase line) from being tripped.

Panel 210 can include any electrical panel for interfacing chargers 204 with electrical grid. Panel 210 can include circuitry, wiring, circuit breakers 222 and power lines, such as the first power line 212, second power line 214 and third power line 216. Each power line 212, 214 and 216 can operate at its own phase. Panel 210 can provide receive and provide power to the electrical grid using three phases via power lines 212, 214 and 216. Panel 210 can be configured (e.g., via circuitry and/or electronics) to provide power to chargers 204 and receive power from chargers 204. Panel 210 can be connected to the electrical grid on one side and to any number of chargers 204 on the other. Multiple chargers 204 can be electrically coupled with the same one or more phases of the panel 210 (e.g., phases at power lines 212, 214 and/or 216).

Panel capacity 218 can include any maximum operating capacity of the panel 210. Panel capacity 218 can include a power, current or voltage limitation of the panel 210, at any power level, such as power levels sufficient to accommodate multiple (e.g., 2, 4, 8, 10 or more) simultaneously operating level 1, level 2 and level 3 chargers 204. Panel capacity 218 can include voltage, current or power threshold for the panel 210 at which breakers 222 can be tripped. For example, panel capacity 218 can include maximum power capacity of a single or three power lines at the panel, such as the maximum capacity of the first power line 212 and the second power line 214. For example, the first power line 212 and the second power line 214 can include a power capacity of 100 A at anywhere between 110 and 220V. Breakers 222 can be configured to trip when the power capacity of the power lines 212 and 214 are exceeded, therefore limiting the charger 204 operation at a power range that is below the panel capacity 218. Panel 210 can include multiple panel capacities 218, such as panel capacities for any combination of power lines 212, 214 and 216, including for example a panel capacity 218 for first and second power lines 212 and 214 and another panel capacity 218 for first and third power lines 212 and 216. The panel capacities 218 for any power lines 212, 214 and/or 216 can be same or different from each other, depending on the configuration. Panel capacities 218 can be configured such that breakers 222 are tripped when the power (e.g., voltage and current) are exceeded.

Breakers 222 can include any circuit breakers, contactors or other devices for protecting panel 210 or its circuitry from overcurrent or short circuits. Breakers 222 can be distributed at various points of the panel 210. For example, a breaker 222 can be applied to any of the first, second or third power lines 212, 214, 216, with respect to the ground of the panel 210. The ground of the panel 210 can be shared or coupled with the ground lines of the chargers 204. Accordingly, a breaker 222 can be installed on a first power line 212 and a ground, second power line 214 and the ground and/or third power line 216 and the ground. A breaker 222 can be installed on all three phases (e.g., power lines 212, 214 and 216) and the ground to cap the maximum power throughput at a three-phase level.

Data processing system (DPS) 230 can include any combination of hardware and software for providing or establishing a configuration 232 and/or settings 234 for a site 202, one or more chargers 204 and/or a panel 210. DPS 230 can include processors 610 processing instructions stored in memories, such as main memory 615, ROM 620 or storage device 625, to implement actions or functionalities of the DPS 230. DPS 230 can receive, via network 101, data, from any number of EVs 105. DPS 230 can utilize validation functions 246 to implement site configurations 232, and utilize display functions 248 to provide representations 236 of the site configurations 232. DPS 230 can provide user interface 240 to the users. DPS 230 can include and/or implement power controller 208 along with charger profiles 252 that can be established based on settings 234 in order to implement the particular site configuration 232. DPS 230 can implement its functionality using instructions stored in a memory, such as main memory 615, ROM 620 or storage device 625 and implemented using processors (e.g., processor 610).

DPS 230 can include functions operating on a server or any other network device, a cloud or any other service, such as a software as a service platform. DPS 230 can include a cloud-based service or a service provided by one or more servers. DPS 230 can be accessible to user devices, such as smartphones or computers, which the users can utilize to access site configurations 232 and display representations 236 via user interfaces 240, using the display function 248. DPS 230 can provide validation function 246, via which the user can validate, establish or set a configuration 232. DPS 230 can include or use a profile generator 238 to generate charger profiles 252 to implement the set, established or validated configuration 232 in accordance with the settings 234 and/or inputs 242.

DPS 230 can include a computing system or a device that is located at the site 202 and that is communicatively connected to the panel 210. For example, DPS 230 can be a device that is integrated with, attached to, coupled with or included in the panel 210. For example, DPS 230 can be a device that is connected to the panel 210 via a wiring or a wireless connection. DPS 230 can communicate with the panel 210 and the chargers 204 via a wired or a wireless network 101 or a local area network located or established at the charging site 202. For example, a panel 219 can be connected to, or include a computing device (e.g., a DPS 230) that includes a display device with the user interface 240. The operator of the site 202 can go to the panel 210 and use the DPS 230 on the panel 210 to update the power or phase mapping, adjust the settings 234 (e.g., policies) or reconfigure any aspect of the configuration 232 using the user interface.

Each charger 204 can include its own operational characteristics 254. Operational characteristics 254 can identify features, traits and properties of a charger 204. Operational characteristics 254 can be unique to the charger 204 and distinguish a charger 204 from other chargers 204 of the same type or configuration. For example, operational characteristics 254 can include configurations or settings of a charger 204, such as charger operational output (e.g., power output ratings, power input ratings, phase configurations or other features). Operational characteristics 254 can include an operational status of the charger 204, such as whether the charger is functional or not, and at which power level the charger 204 is operating (e.g., as opposed to the power level at which it is rated to operate). For example, operational characteristics 254 can identify a maximum power output level of a charger 204A that is less than a maximum power output level of one or more other chargers 204 at the site 202. For example, operational characteristics 254 can identify that a charger 204 is rated and configured to operate at 100% of its rated charger capacity 250, but that its actual power output is at 50% of the rated charger capacity 250 (e.g., the rating being 25 kW of AC power, but the charger actually operating at a maximum of 10 kW of AC power). Operational characteristics 254 can identify a malfunction, an error or underperformance of the charger 204. Operational characteristics 254 can identify an upgrade of a charger 204, allowing the charger 254 to operate above its original rated power capacity 250.

Chargers 204 can include a default setting for chargers 204 in the event in which the communication with the DPS 230 is unavailable. For example, when a DPS 230 is off line or unavailable for longer than a predetermined time duration (e.g., 5, 10 or 15 minutes) chargers 204 can resort to a setting 234 that is conservative in terms of the amount power at which chargers 204 operate. For example, chargers 204 can determine that a time period without any communication with a DPS 230 exceeds a predetermined threshold. In response to this determination, chargers 204 can resort to a default or backup charger profile 252 by which chargers 204 can have their power throughput capped at a power level at which the sum of all power throughputs from all chargers 204 at the site 202 does not exceed the panel capacity 218 of the panel 210.

Site configuration 232 can include any configuration or a setup for power distribution of chargers 204 with respect to a panel 210 at a site 202. Site configuration 232 can include a setup or a configuration by which chargers 204 operate at particular power levels. The power levels of operation of the chargers 204 can be at charger capacities 250, an offset (e.g., 10% or 20%) below the charger capacity 250 or at any other power level below the charger capacity 250. Site configuration 232 can include a configuration of power, voltage or current levels of each of the chargers 204. Site configuration 232 can include a setup or configuration of power lines 212, 214 or 216 to which each of the chargers 204 is connected. For example, site configuration 232 can include a setup by which a first charger 204 is connected to a first power line 212 and a second charger 204 is connected to the same first line 212 or a different power line (e.g., lines 214 or 216). Configuration 232 can define the connections of the chargers 204 such that multiple chargers 204 at a site 202 are connected to a same line 212 or different lines 212, 214 and 216.

Settings 234 can include any settings, configurations, policies or rules for configuring chargers 204 at a site 202. Settings 234 can include a policy or a set of rules in accordance with which chargers 204 operate at set power levels. Settings 234 can include policies or rules for managing power output from chargers 204 to ensure that panel capacity 218 is not exceeded, while providing chargers 204 with maximum amount of power to operate within the confines of the panel capacity 218 limitation.

Settings 234 can include a policy or a set of rules for powering EVs at a site 202 in accordance with first in first out (FIFO) order. For example, a FIFO setting 234 can prioritize those chargers 204 that were activated earliest over those that began to be used (e.g., are activated) at a later time. For example, in a FIFO setting 234, a first charger 204 that was activated by a user an hour ago is given precedence in terms of power output over a second charger 204 that was activated by another user 30 minutes ago. In a FIFO setting 234, if there is a surplus power to be provided to the first and second chargers 204 to allow one of those chargers to operate at charger capacity 250, the charger 204 that was activated first (e.g., the first charger 204) would be given the maximum amount of power, up to its charger capacity 250, while the second charger 204 would get whatever power is left over up to the panel capacity 218.

Settings 234 can include a policy or a set of rules for powering EVs at a site 202 in accordance with an equal share of power for all chargers. For example, an equal share setting 234 can distribute power across chargers 204 such that the power distribution is substantially equally distributed. For example, in an equal share setting 234, a first charger 204 can be provided a set amount of power, voltage or current and a second charger 204 can be provided with a substantially same amount of power. For example, the difference between the power amounts provided to the two chargers can differ by about up to 1%, 2%, 5%, 10%, 15% or 20%. In an equal share setting 234, any surplus power to be provided to the chargers 204 can be provided equally (e.g., substantially equally) across all the available chargers 204. For instance, each charger 204 can receive a charger policy 252 in accordance with which the chargers 204 operate at the same power levels across the site 202. Settings 234 can include a policy or a set of rules to provide power to EVs 105 based on features of the EV 105 at the site 202. For example, a setting 234 can include a policy or a set of rules assigning priority to EVs 105 based on a type of vehicle. For example, setting 234 can assign or grant priority to one EV 105 over other EVs 105 based on whether it is a hybrid vehicle or a full electric vehicle, based on the battery size of the EV 105, based on the state of charge of the battery pack 110 (e.g., the amount of charge remaining in the EV 105), based on types of battery pack 110, battery modules 115 or battery cells 120. Setting 234 can assign or grant priority to an EV 105 over other EVs 105 based on state of health of the battery pack 110, battery module 115 or battery cells 120.

Setting 234 can provide power to EVs 105 based on the operational characteristics 254 of chargers. For example, setting 234 can provide or assign power levels to EVs 105 based on maximum power output from the chargers 204, or in accordance with on the operational characteristics 254 of one or more charging stations 204. For example, a charger 204 can be fully functional (e.g., operating at up to 100% of their capacity) while another charger 204 can be limited in terms of its power output. For example, a charger 204 limited in terms of its power output can function or provide less than 100% of its rated power output (e.g., for example 70%). Setting 234 can assign the power levels to the EV 105 so that it is commensurate with, corresponding to, or associated with the power output limitation of the EV 105 or any other operational characteristics 254. For example, setting 234 for a charger limited in terms of its power output (e.g., at 70%) can be set at a threshold of up to its maximum power output (e.g., 70%), while a charger 204 that is operational up to 100% of its power output may have a higher power output limitation (e.g., at up to 75%, 80%, 90% or 100%).

Representation 236 can include any representation of the configuration 232. Representation 236 can include a representation that can be generated by a display function 248 to provide, illustrate or display a site configuration 232 to the user. Representation 236 can be generated by a display function 248 and can include a layout or a map of a site 202 along with any chargers 204 connected to any power lines 212, 214 or 216. Representation 236 can illustrate, depict or reflect any settings 234 user inputs 242 or outputs 244. Representation 236 can be provided via a user interface 240. Representation 236 can include a site level view of the site 202 along with all the chargers 204 and panels 210 at the site.

For example, representation 236 can include a representation of 3-phase electrical panel. Representation 236 can include a representation of breaker switches 222 on the panel 210 to which each charger 204 is connected. Representation 236 can include an indication of an assignment of chargers to show the physical wiring of the chargers 204 to the phase lines of the panel 210. The representation 236 can include a visualization of all chargers 204 that are connected to a particular phase line.

User interface 240 can include any user interface for displaying, illustrating or mapping a representation 236 of a configuration 232 to user. User interface 240 can receive user inputs 242 and provide outputs 244. Inputs 242 can include any inputs or selections from a user configuring or validating the configuration 232. For example, input 242 can include policy selections (e.g., settings 234 selections) that can be provided by the user. Input 242 can include breakers 222 selections or configurations. Input 242 can include charger 204 selections, inputs or configurations. User interface 240 can provide a site level view of the site 202. The site level view can illustrate, depict or map all of the chargers 204 and panels 210 at a site, along with their electrical interconnections, panel capacities 218, charger capacities 250 and charger profiles 252.

Outputs 244 can include any outputs of the user interface 240 and/or the representation 236 of the configuration 232 to the user. Outputs 244 can include a map or layout of the site 202. Outputs 244 can include a graphical representation of connection between the chargers 204 and the power lines 212, 214 or 216, as well as representation of any particular breakers 222 to which the chargers 204 are connected. Outputs 244 can include power, current or voltage levels (e.g., capacities) of the panel 210 (e.g., panel capacity 218) or charger 204 (e.g., charger capacity 250).

Validation function 246 can include any function of the representation and/or the user interface 240 by which a user can validate a representation 236 and/or the configuration 232. Validation function 246 can include a function for utilizing inputs 242 and/or settings 234 selected or input by the user to configure or setup the configuration 232. Validation function 246 can allow for user inputs 242 to generate charger profiles 252.

Validation function 246 can operate with a profile generator 238 to determine the charger profiles 252. In some instances, validation function 246 can determine that a configuration 232 is invalid. For example, the validation function 246 can identify an error in the configuration 232, such as an incorrect breaker 222 connected to a power line 212, 214 or 216. Validation function 246 can provide an output 244 to the user suggesting a modification. The user can provide an input 242 or a modified setting 234, upon which the validation function 246 can reevaluate the configuration 232.

Profile generator 238 can include any combination of hardware and software for generating charger profiles 252. Profile generator 238 can generate charger profiles 252 based on or using any combination of site configuration 232, settings 234, inputs 242 and outputs 244. Profile generator 238 can generate charger profiles 252 in accordance with settings 234 and/or in order to implement the configuration 232 per settings 234. Profile generator 238 can generate charger profiles 252 to implement a FIFO settings 234 or equal share settings 234. Profile generator 238 can generate charger profiles to prefer a particular make and/or model of EVs 105 over other make and/or model of EVs 105.

Charger profiles 252 can include any combination of instructions, rules or settings for a particular charger 204 in order to implement a configuration 232. Charger profiles 252 can be same or different for any chargers 204. Charger profiles can be generated based on or in accordance with settings 234, inputs 242 and/or outputs 244. Charger profiles 252 can be generated in response to a validation by a user via a validation function 246. Charger profile 252 can limit or set a current, a voltage and/or power level or range for a charger. Charger profile 252 can include any information about the charger 204, such as the make and model of the charger 204, serial number of the charger 204, network address or identifier of the charger 204, data on how the charger 204 is connected to the panel 210 (e.g., via which lines 212, 214 or 216) as well as in accordance with which power/voltage/current limitations.

Display function 248 can include any display function for displaying representation 236 to the user. Display function 248 can generate the mapping, illustration or depiction of the site 202 along with chargers 204, and any electrical connections between the chargers 204 and the panel 210. Display function 248 can illustrate or depict representations 236 of the configuration 232 along with any settings 234, inputs 242 or outputs 244.

Figure 3:
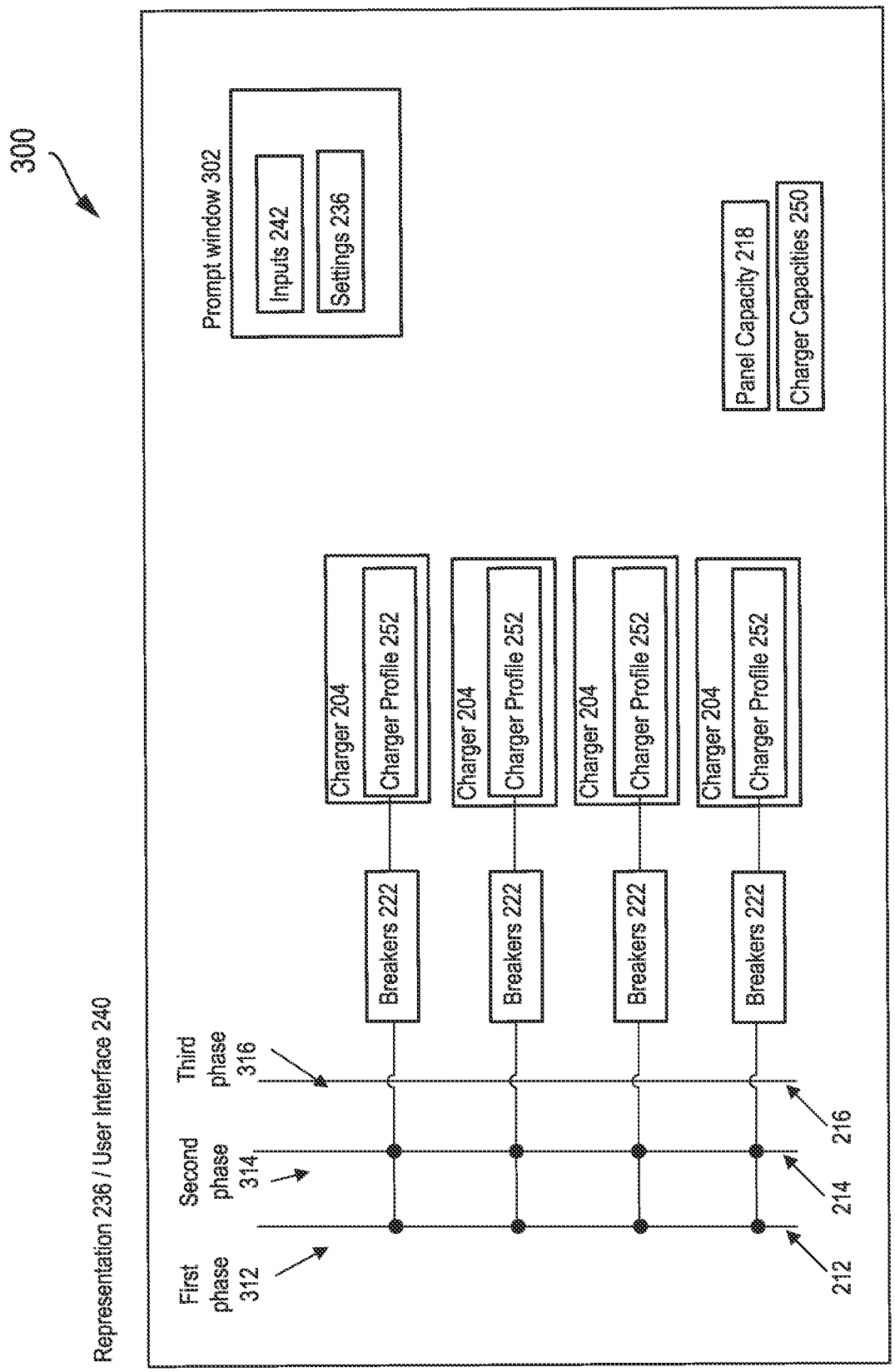
FIG. 3 depicts an example of a representation as provided by a user interface of the present solution to configure chargers at a charging site.

FIG. 3 illustrates an example 300 of a representation 236 of a configuration 232 for load management of chargers 204 at a site 202, as displayed to user using a user interface 240. Depicted representation 236 shows a prompt window 302 providing inputs 242 and settings 234 that a user can provide or select. Representation 236 can also include multiple power lines (e.g., 212, 214 and 216), each one of which can correspond to its own individual phase (e.g., first phase 312, second phase 314 and third phase 316). Breakers 222 can be disposed or located between the electrical conductors connecting each of the chargers 204 and each of the power lines (e.g., 212, 214 or 216) allowing each of the chargers 204 to operate at one or more of a first phase 312, second phase 314 and/or third phase 316. Each charger 204 can include its own charger profile 252. Charger profile 252 can include any information about the charger 204, such as the charger serial or model information or charger 204 identifier on the network.

Prompt window 302 can include any edit panel by which the user can input or select any inputs 242 or settings 234. Prompt window 302 can include the functionality by which the user can select settings 234 (e.g., policies) by which chargers 204 can operate, such as the FIFO setting 234, equal share setting 234 or any other setting 234. For example, prompt window 302 can receive inputs from the user for configuring or validating the configuration 232 as represented by the representation 236. Via prompt window 302, the DPS 230 can receive inputs 242, such as power, current or voltage limitations for the charger 204, selection of breakers 222 for chargers 204 or selections power lines (e.g., 212, 214 or 216) to which each of the chargers 204 can be connected. Using the prompt window 302 the user can reconfigure or design the connections between the chargers 204 and various power lines 212, 214 and/or 216 in the panel 210.

Representation 236 can include information relating to the panel capacity 218 and charger capacities 250. Representation 236 can include outputs 244, which can be generated in accordance with or based on inputs 242 or settings 234. Representation 236 can depict, illustrate or provide configuration 232 of the site 202 in accordance with charger profiles 252 as derived, determined or established based or, or according to, settings 234 and/or inputs 242.

The present solution can include a system (e.g., system 200) for load management of chargers 204 at a charging site 202. The system 200 can utilize one or more processors (e.g., 610) coupled with memory (e.g., 615, 620 or 625). The one or more processors 610 can be configured (e.g., using the instructions stored in the memory 615, 620 or 625) to identify a configuration 232. The configuration 232 can indicate a plurality of chargers 204 coupled with a first line 212 of an electrical panel 210 to conduct power at a first phase 312 and a second line 214 of the electrical panel 210 to conduct power at a second phase 314 different than the first phase 312. The two phases 312 and 314 can be two phases of a three-phase power or electricity provided to the panel 210. The configuration 232 can indicate a power capacity 218 of the electrical panel 210. The one or more processors 610 can be configured to provide, for display via a graphical user interface 240, a representation 236 of the configuration 232. The one or more processors 610 can be configured to validate, responsive to an input (e.g., 242 or 234), the representation 236 of the configuration 232 to cause a power controller 208 to deliver power to a charger 204 of the plurality of chargers 204 via the first line and the second line based on the power capacity of the electrical panel. The one or more processors 610 can be configured to cause, based on the configuration 232 and operational characteristics 254 associated with one or more of the plurality of chargers 204, a controller 208 to deliver power to a charger 204 of the plurality of chargers 204 via the first line (e.g., 212) or the second line (e.g., 214) based on the power capacity of the electrical panel 210.

Charger 204 configured by the DPS 230 can be connected to one, two or three power lines 212, 214 or 216, each one operating at its own phase (e.g., 312, 314 or 316) and as well as to a ground of the panel 210. Charger 204 can utilize power electronics 165 controlled by the power controller 208 in accordance with charger profile 252. Charger profile 252 of the charger 204 can be generated or established by the DPS 230 based on, or in accordance with, the site configuration 232.

System 200 can include one or more processors 610 configured to identify a setting 234 of the configuration 232. The one or more processors 610 can be configured to validate, responsive to a user selection (e.g., via inputs 242) of the setting 234 (e.g., a policy or one or more rules to operate a site 202), the representation 236 of the configuration 232. The validation can cause the controller (e.g., power controller 208) to load balance power of the charger 204 of the plurality of chargers 204 in accordance with the setting 234. For example, DPS 230 can utilize a profile generator 238 for the chargers 204 of the site 202 according to, or based on, configuration 232 established in accordance with settings 234 and responsive to the validation by the user via a validation function 246 and/or user interface 240.

The one or more processors 610 can be configured to cause the controller 208 to prioritize, based on a setting 234 of the configuration 232 selected by a user, a power of the charger 204 (e.g., an amount of power provided to the charger 204) over a power of a second charger 204 of the plurality of chargers 204 based on the charger 204 being activated prior to the activation of the second charger 204. For example, when a first charger 204 has started being used prior to the second charger 204, the setting 234 (e.g., policy) can cause the DPS 230 to generate or provide charger profiles 252 for the first and second chargers 204 to cause the first charger 204 to be given a priority at the amount of power to use (e.g., be given all power available, up to the charger capacity 250), while leaving the leftover power to second charger 204.

The one or more processors 610 can be configured to receive, via the graphical user interface, the input 242 comprising a user selection of a setting 234 of the configuration 232. The one or more processors 610 can be configured to cause the controller 208 to deliver, based on the setting 234, a substantially equal amount of power to the charger 204 as is delivered to a second charger 204 of the same plurality of chargers 204 in accordance with the power capacity 218 of the electrical panel 210. The power capacity 218 of the electrical panel 210 corresponding to a power capacity of the first line 212 and/or the second line 214. For example, the charger 204 can be provided within 5% or 10% of the power that is provided to the second charger 204 (e.g., substantially the same).

The power capacity 218 of the electrical panel 210 can correspond to a power capacity of the first line 212 and the second line 214 and the controller (e.g., power controller 208) can be configured to cause power to be delivered to the charger 204 of a subset of the plurality of chargers 204 in accordance with an individual capacity (e.g., charger capacity 250) of each of the subset of the plurality of chargers 204. The sum of the individual capacities (e.g., charger capacities 250) of the subset of the plurality of chargers 204 may not exceed the power capacity 218 of the first line 212 and the second line 214. The sum of individual capacities (e.g., charger capacities 250) of the plurality of chargers can exceed the power capacity 218 of the first line 212 and the second line 214. For example, the charger 204 can be provided the amount of power corresponding to the charger capacity 250 of the charger 204, while the second charger may receive only a subset of the amount of power provided to the (first) charger 204 (e.g., a fraction of power that may be limited in order to satisfy the panel capacity 218).

Power controller 208 can be configured to identify, via a site level view of the graphical user interface 240, a subset of the plurality of chargers 204. The subset of the plurality of chargers can include the charger 204. Each of the chargers 204 of the subset can have an individual power capacity (e.g., charger capacity 250) and can be configured to exchange power with an electric vehicle. For example, each charger 204 can include a power cable 160 that can connect to an EV 105. A sum of the individual power capacities 250 of the subset of chargers 204 can be greater than the power capacity 218 of the electrical panel 210 or the power capacity of one or more (e.g., two or three) power lines (e.g., phase lines) in the electrical panel. The power controller 208 can cause a substantially equal amount of power to be delivered to the charger 204 of the subset of the chargers as is delivered by a second controller 208 to a second charger 204 of the subset of chargers 204. The power can be delivered by the controller 208 and the second controller 208 in accordance with an offset from a power level of a breaker switch 222 performing in accordance with the power capacity 218 of the electrical panel 210.

The power controller 208 can be configured to identify, via a site level view of the graphical user interface 240, a subset of the plurality of chargers 204. The subset can include the charger 204. Each of the chargers 204 of the subset can be configured to exchange power with an electric vehicle 105 and can have an individual power capacity (e.g., charger capacity 250). A sum of the individual power capacities (e.g., 250) of each of the chargers 204 of the subset can be greater than the power capacity 218 of the electrical panel 210. The power controller 208 can cause power to be delivered to the charger 204 of the subset of the chargers 204 in accordance with an order in which the charger 204 of the subset is activated. The charger 204 of the subset can be activated prior to a second charger 204 of the subset and can operate at the individual power capacity (e.g., charger capacity 250) of the charger. For example, a charger that was used by an EV 105 prior to a second charger 204 can be given all of the power available up to the charger capacity 250 of the (first) charger. The second charger 204 can receive only the leftover power, to the extent available. If available, the second charger can receive the power up to the power capacity 250 of the second charger 204. If however there is no power available after satisfying the first charger 204, the second charger 204 can only receive the amount of power that is left up to the panel capacity 218.

Power controller 208 can be configured to cause power to be distributed to the charger 204 of a subset of the plurality of chargers 204 in accordance with the power capacity 218 of the electrical panel 210. Controller 208 can be configured to detect an electric vehicle 105 coupled with the charger 204. The charger 204 can be coupled with the first line 212 and the second line 214. Controller 208 can be configured to cause, responsive to the detection of the electric vehicle 105, power to be redistributed across the subset of the plurality of chargers 204 in accordance with the power capacity 218 of the first line 212 and the second line 214. For example, the power can be redistributed so that it can be equally share across the subset of the chargers. The subset of the chargers can include active chargers (e.g., chargers used at that moment). For example, the power can be redistributed in accordance with the FIFO policy (e.g., the earliest used charger 204 receives the maximum power available before subsequent chargers receive any power).

In some aspects, the present solution relates to a non-transitory computer-readable media having processor 610 readable instructions. The instructions, when executed, can cause a processor 610 to identify the configuration 232 indicating a power capacity 218 of an electrical panel 210 and a plurality of chargers 204 coupled with a first line 212 of the electrical panel 210 to conduct power at a first phase 312 and a second line 214 of the electrical panel 210 to conduct power at a second phase 314 different than the first phase 312. The instructions can cause the processor 610 to provide, for display via a graphical user interface 240, a representation 236 of the configuration 232. The instructions can cause the processor 610 to receive an input 242 corresponding to the configuration 232. The instructions can cause the processor 610 to validate, responsive to the input 242, the representation 236 of the configuration 232 to cause a controller 208 to deliver power to a charger 204 of the plurality of chargers 204 via the first line 212 and the second line 214 based on the power capacity 218 of the electrical panel 210.

The instructions can cause or configure the processor 610 to identify a setting 234 of the configuration 232. The instructions can cause or configure the processor 610 to validate, responsive to a user selection of the setting 234, the representation 236 of the configuration 232 to cause the controller 208 to deliver power to the charger 204 of the plurality of chargers 204 in accordance with the power capacity 218 of the electrical panel 210, corresponding to a power capacity 218 of the first line 212 and the second line 214 and in accordance with the setting 234. The instructions can cause or configure the processor 610 to cause the controller 208 to prioritize, based on a setting 234 of the configuration 232 selected by a user, a power of the charger 204 of the plurality of chargers 204 over a power provided to a second charger 204 of the plurality of chargers 204 based on the (first) charger 204 being activated prior to the activation of the second charger 204 (e.g., the first charger 204 was being used by an EV 105 prior to the time when the second charger 204 started being used by a second EV 105).

The instructions can cause or configure the processor 610 to receive, via the graphical user interface 240, the input 242 comprising a user selection of a setting 234 of the configuration 232. The instructions can cause the processor 610 to cause the controller 208 to deliver, based on the setting 234, a substantially equal amount of power to the charger 204 as delivered to a second charger 204 of the plurality of chargers 204 in accordance with the power capacity 218 of the electrical panel. The power capacity 218 of the electrical panel 210 can correspond to a power capacity of the first line 212 and/or the second line 214.

Figure 4:
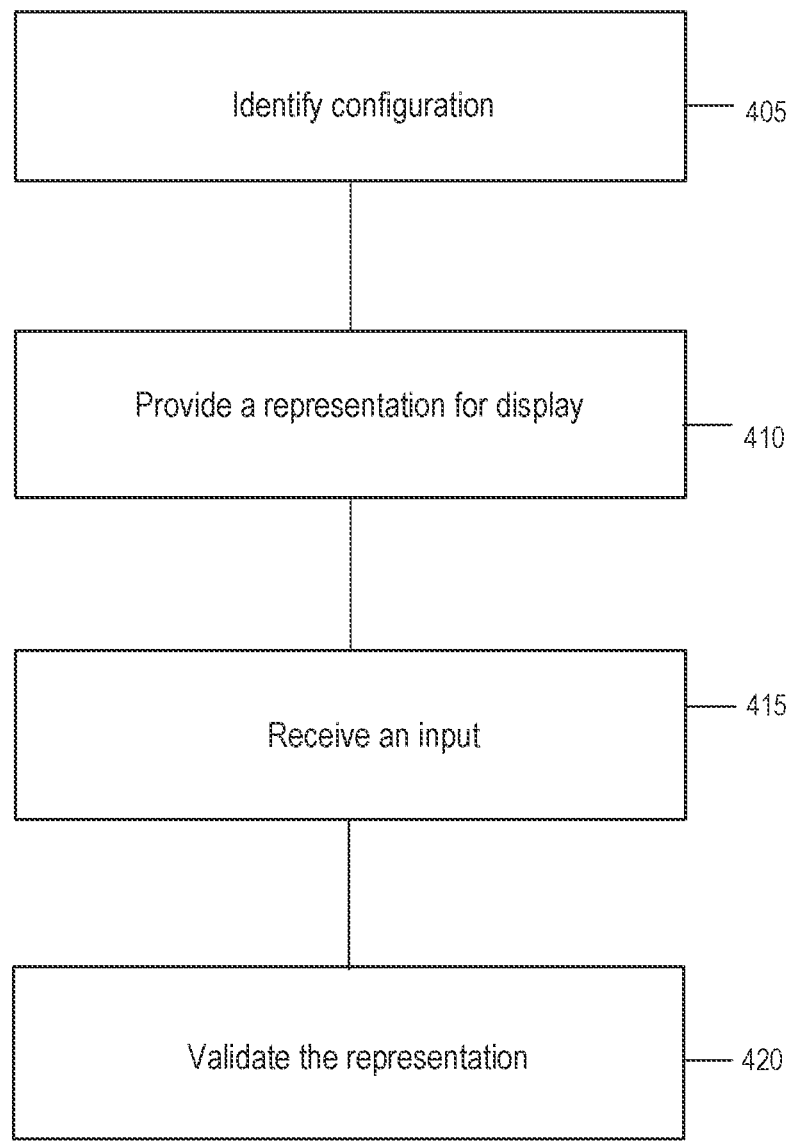
FIG. 4 is a flow diagram illustrating an example method for configuring chargers at a charging site.

FIG. 4 illustrates a method 400 for load management of chargers 204 utilizing the system 200 depicted in FIGS. 2 and 3 to configure chargers 204 attached to a panel 210 at a site 202. Method 400 can utilize a cloud-based system to provide a user validation and/or configuration 232 to a site 202 having chargers 204 electrically coupled with an electrical panel 210. The method can include ACTS 405-420. At ACT 405, the data processing system identifies a configuration. At ACT 410, the data processing system provides a representation for display. At ACT 415, the data processing system receives an input. At ACT 420, the data processing system validates the representation.

At ACT 405, the method identifies a configuration. The method can include the DPS identifying the configuration indicating a power capacity of an electrical panel. DPS can identify a plurality of chargers coupled with a first line of the electrical panel to conduct power at a first phase and a second line of the electrical panel to conduct power at a second phase different than the first phase. DPS can identify the site 202 and all active, available or configured chargers at the site.

The method can include the DPS identifying a setting of the configuration. The setting of the configuration can be identified based on a user input or a user selection of the setting. The setting can include a policy according to which to distribute power across the chargers at the site. The setting can include a first in first out (FIFO) policy. The FIFO setting or a policy can cause the chargers to provide the highest priority to those chargers who were activated first, allowing such earlier activated chargers to receive all the power up to their individual power capacity. The setting can include an equal share policy or a setting. The equal share setting or a policy can cause the chargers to distribute power such that each charger operates at a substantially same power level (e.g., to within 5% or 10%) as any other active charger.

The method can cause the DPS to identify, via a site level view of the graphical user interface, a subset of the plurality of chargers. The subset can include the (e.g., first) charger. Each of the chargers of the subset can have an individual power capacity of the charger itself and can be configured to exchange power with an electric vehicle. A sum of the individual power capacities of the subset can be greater than the power capacity of the electrical panel.

The method can include causing the DPS to identify, via a site level view of the graphical user interface, a subset of the plurality of chargers comprising the charger. Each of the chargers of the subset can be configured to exchange power with an electric vehicle and can have an individual power capacity (e.g., maximum operating power capacity). A sum of the individual power capacities of each of the chargers of the subset can be greater than the power capacity of the electrical panel.

At ACT 410, the method provides a representation for display. The method can include the DPS providing for display via a graphical user interface, a representation of the configuration. The representation can include a site view illustrating the site with the chargers and the panels. The representation can include a map or a layout, a schematic or an interactive chart or illustration of the representation of the configuration. For example, the configuration can be edited, configured or modified by the user based on user inputs or selections on the representation.

At ACT 415, the method receives an input. The method can include the DPS receiving an input. The input can be an input from a user. The input can be received via the graphical user interface representation of the configuration. The DPS can receive, via the graphical user interface, the input comprising a user selection of a setting of the configuration. The setting can include a FIFO setting. The setting can include an equal share setting. The setting can include a setting by which electric vehicles of one manufacturer are given precedence over electric vehicles of other manufacturers. The setting can include a policy or a setting by which a first charger can have priority in terms of the power received from the electrical panel based on any combination of factors, such as: a type of electric vehicle being serviced (e.g., hybrid vehicle versus a full electric vehicle), a battery capacity of the vehicle (e.g., vehicle with a large capacity battery above a battery capacity threshold versus a vehicle with a small capacity battery below the battery capacity threshold), a state of charge of the vehicle (e.g., amount of charge remaining in the battery). For example, upon being plugged to the vehicle, the charger can determine the make and model of the vehicle, the battery capacity, the amount of charge stored or type of the battery. Based on these information, the setting or the charger profile from the DPS can cause the charger to operate at a particular power level.

The setting can include a policy or a setting by which a first charger is given precedence over a second charger. The setting can include a policy or a setting by which some users of electric vehicles are given precedence over other users. For example, a charger with a high priority user can be given maximum power output for the charger (e.g., charger capacity power level) while a charger with a low priority user can be given a lower amount of power, or an amount of power remaining after the charger of the high priority user has been fully powered.

At ACT 420, the method validates the representation. The method can include the DPS validating, responsive to the input, the representation of the configuration to cause a controller to deliver power to a charger of the plurality of chargers via the first line and the second line based on the power capacity of the electrical panel. For example, the DPS can generate charger profiles for the chargers at the site, causing the charger to provide power to the charger (and other chargers at the site) in accordance with the setting (e.g., user selected policy).

The method can include the DPS validating, responsive to a user selection of the setting, the representation of the configuration to cause the controller to load balance power to the charger of the plurality of chargers in accordance with the setting. DPS can cause the controller to prioritize, based on a setting of the configuration selected by a user, a power of the charger of the plurality of chargers over a power of a second charger of the plurality of chargers based on the charger activated prior to activation of the second charger. For example, an earlier activated charger can be given a maximum available amount of power prior to determining the amount of power for a second (e.g., subsequently activated) charger of the plurality of chargers.

DPS can cause the controller to deliver, based on the setting, a substantially equal amount of power the charger of the plurality of chargers as is delivered by a second controller to a second charger of the plurality of chargers in accordance with the power capacity of the electrical panel, the power capacity of the electrical panel corresponding to a power capacity of the first line and the second line. DPS can cause the controller to deliver power to the charger of a subset of the plurality of chargers in accordance with an individual capacity of each of the subset of the plurality of chargers. For example, the power capacity of the electrical panel can correspond to a power capacity of the first line and the second line. For example, the sum of the individual capacities of the subset of the plurality of chargers may not exceed the power capacity of the first line and the second line.

The method can include the DPS causing the controller to deliver power to the charger that is substantially equal to the power delivered across each of chargers of the subset of the chargers in accordance with an offset from the power capacity of the electrical panel. For example, a first charger can be provided an amount of power that is within about 5% or 10% equal to the amount of power provided to the second charger. The DPS can cause the controller to deliver power to the charger of the subset of the chargers in accordance with an order in which the charger of the subset is activated. For example, the (first) charger can be activated prior to a second charger of the subset and based on its earlier activation it can be configured to operate at the individual power capacity of the charger. The second charger can be configured to operate at an amount of power that is left over after the power has been assigned or provided to the first (e.g., earlier activated) charger.

The method can include the data processing system causing a controller to deliver power to a charger of the plurality of chargers via a first line or the second line based on the power capacity of the electrical panel. The data processing system can cause the controller to deliver power to the charger via the first line or the second line based on the power capacity of the panel based on the configuration and operational characteristics associated with one or more of the plurality of chargers. For example, one of the plurality of chargers can include an operational characteristic making one of the plurality of chargers incapable of operating at a desired or intended power level. In response to the charger being incapable of operating at a desired or intended power level (due to its operational characteristics), the data processing system can cause the controller to deliver power to another charger of the plurality of chargers. In response to the charger being incapable of operating at a desired or intended power level (due to its operational characteristics), the data processing system can reset the charger profile of this charger to establish its operation at the power level at which the charger can operate.

The method can include the DPS causing the controller to distribute to the charger of a subset of the plurality of chargers in accordance with the power capacity of the electrical panel. The DPS can cause the controller to detect an electric vehicle coupled with the charger, the charger coupled with the first line and the second line. The DPS can cause causing, responsive to the detection of the electric vehicle, the controller to redistribute power across the subset of the plurality of chargers in accordance with the power capacity of the first line and the second line.

Figure 5:
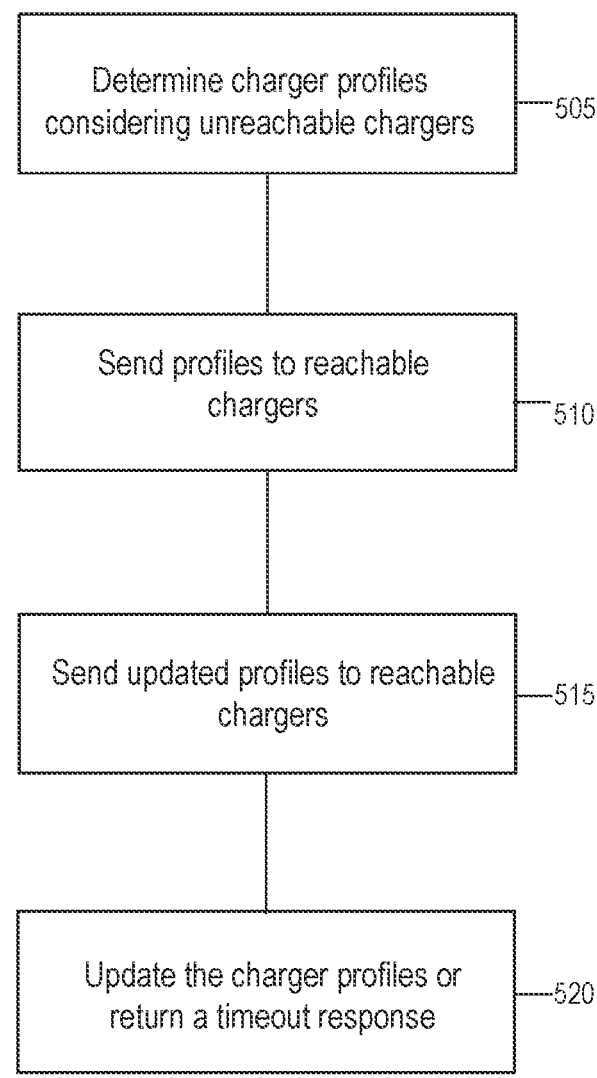
FIG. 5 is a flow diagram illustrating an example method of reconfiguring available chargers at a charging site.

FIG. 5 illustrates a method 500 utilizing the system 200 from in FIGS. 2 and 3 to configure chargers 204 attached to a panel 210 at a site 202. Method 500 can utilize a cloud-based system to provide configuration 232 to available chargers 204 at a site 202 along with periodic updates. The method can include ACTS 505-520. At ACT 505, the data processing system determines charger profiles considering unreachable chargers. At ACT 510, the data processing system sends profiles to the reachable chargers. At ACT 515, the data processing system sends updated profiles to reachable chargers. At ACT 520, the chargers update the charger profiles or return a timeout response.

At ACT 505, the method determines charger profiles considering unreachable chargers. The method can include the DPS determining charger profiles taking into account unreachable chargers. For example, DPS can be aware of a subset of unreachable chargers that are operating at a particular power level. For example, DPS can be aware of a second subset of unreachable chargers that are not operational. DPS can determine a configuration, based on a setting (e.g., a policy) considering the first subset of chargers and/or the second subset of chargers. DPS can determine that charger profiles for each of the chargers in accordance with the unreachable chargers. For example, DPS can determine charger profiles for the chargers at the site in accordance with unreachable chargers that are operating and accounting for the power at which they operate. For example, DPS can determine charger profiles for the chargers at the site in accordance with unreachable chargers that are not operational. DPS can determine the charger profiles excluding the chargers that are not operational.

At ACT 510, the method sends profiles to the reachable chargers. DPS can generate and send the charger profiles to the chargers over network interfaces and via the network. DPS can generate and send the charger profiles to the chargers that are reachable. DPS can generate and send the charger profiles to the chargers that are unreachable. Charger profiles can be generated in accordance with a setting selected by a user. Charger profiles can be generated in accordance with a FIFO policy, an equal share policy or a preferred (high priority) user policy as described in connection with method 400.

At ACT 515, the method sends updated profiles to reachable chargers. The method can include the DPS generating and sending updated or regenerated charger profiles after a time period (e.g., one or more seconds or one or more minutes). For example, the DPS can update the charger profiles periodically, such as every minute, every 2 minutes, every 3 minutes, every 5 minutes, every 10 minutes or every 20 minutes. DPS can send the updated charger profiles in response to an event (e.g., detection that an electric vehicle has connected to a charger or that an electric vehicle has disconnected from a charger). DPS can send the updated charger profiles to the reachable chargers. For example, DPS can determine during a prior distribution of charger profiles that some of the chargers are not reachable. In response to this determination, the DPS can send updated charger profiles only to the reachable chargers. In some instances, the DPS can send the updated charger profiles to all the chargers (reachable and unreachable).

At ACT 520, the method updates the charger profiles or returns a timeout response. Chargers can update their charger profiles upon receiving them from the DPS. DPS can receive confirmation from the chargers that the chargers have received and updated the charger profiles. In some instances, DPS can receive from a charger a timeout response. The timeout response can indicate that the charger has not received a charger profile. DPS can determine, periodically or in response to updated profiles, which of the chargers are available and which are not available. For example, DPS can receive the timeout responses with respect to all the unavailable chargers and in response to this, determine that those chargers are not available.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 105 or other end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, a positive or a negative terminal of a battery, or power direction when an electric vehicle is charged or discharged. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   one or more processors coupled with memory to:
      identify a configuration indicating a plurality of chargers coupled with a first line of an electrical panel to conduct power at a first phase and a second line of the electrical panel to conduct power at a second phase different than the first phase;
      present, for display via a graphical user interface, the configuration identifying a sum of individual power capacities of a subset of the plurality of chargers exceeding the power capacity of the electrical panel;
      cause, based on the configuration and operational characteristics associated with one or more of the plurality of chargers, a controller to deliver power to a charger of the plurality of chargers via the first line and the second line based on the power capacity of the electrical panel; and
      cause power to be delivered to the charger of the subset of the plurality of chargers in accordance with an order in which the charger of the subset is activated, the charger of the subset configured to be activated prior to a second charger of the subset and to operate at the individual power capacity of the charger.

2. The system of claim 1, comprising the one or more processors to:
   identify a setting of the configuration; and
   validate, responsive to a user selection of the setting, the representation of the configuration to cause the controller to load balance power of the charger of the plurality of chargers in accordance with the setting.

3. The system of claim 1, comprising:
   the one or more processors to cause the controller to prioritize, based on a setting of the configuration selected by a user, a power of the charger over a power of a second charger of the plurality of chargers based on the charger activated prior to activation of the second charger.

4. The system of claim 1, comprising the one or more processors to:
   receive, via the graphical user interface, an input comprising a user selection of a setting of the configuration; and
   cause the controller to deliver, based on the setting, an amount of power to the charger of the plurality of chargers that corresponds to an amount of power that is delivered to a second charger of the plurality of chargers in accordance with the power capacity of the electrical panel, the power capacity of the electrical panel corresponding to a power capacity of the first line and the second line.

5. The system of claim 1, wherein:
   the power capacity of the electrical panel corresponds to a power capacity of the first line and the second line; and
   the controller is configured to cause power to be delivered to the charger of the subset of the plurality of chargers in accordance with an individual capacity of each of the subset of the plurality of chargers, wherein the sum of the individual capacities of the subset of the plurality of chargers does not exceed the power capacity of the first line and the second line and a sum of individual capacities of the plurality of chargers exceeds the power capacity of the first line and the second line.

6. The system of claim 1, comprising the controller configured to:
   identify, via a site level view of the graphical user interface, the subset of the plurality of chargers comprising the charger, each of the chargers of the subset having an individual power capacity and configured to exchange power with an electric vehicle, the sum of the individual power capacities of the subset greater than the power capacity of the electrical panel; and
   cause an amount of power to be delivered to the charger of the subset of the chargers that corresponds to an amount of power delivered by a second controller to a second charger of the subset, in accordance with an offset from a power level of a breaker switch performing in accordance with the power capacity of the electrical panel.

7. The system of claim 1, comprising the controller configured to:
   identify, via the site level view of the graphical user interface, the subset of the plurality of chargers comprising the charger, each of the chargers of the subset configured to exchange power with an electric vehicle and having an individual power capacity, the sum of the individual power capacities of each of the chargers of the subset greater than the power capacity of the electrical panel.

8. The system of claim 1, comprising the controller configured to:
cause power to be distributed to the charger of the subset of the plurality of chargers in accordance with the power capacity of the electrical panel;
detect an electric vehicle coupled with the charger, the charger coupled with the first line and the second line; and
cause, responsive to the detection of the electric vehicle, power to be redistributed across the subset of the plurality of chargers in accordance with the power capacity of the first line and the second line.

9. A method, comprising:
identifying, by a data processing system, a configuration indicating a power capacity of an electrical panel and a plurality of chargers coupled with a first line of the electrical panel to conduct power at a first phase and a second line of the electrical panel to conduct power at a second phase different than the first phase;
presenting, for display via a graphical user interface, the configuration identifying a sum of individual power capacities of a subset of the plurality of chargers exceeding the power capacity of the electrical panel;
causing, based on the configuration and operational characteristics associated with one or more of the plurality of chargers, a controller to deliver power to a charger of the plurality of chargers via the first line or the second line based on the power capacity of the electrical panel; and
causing, by the data processing system, the controller to deliver power to the charger of the subset of the plurality of chargers in accordance with an order in which the charger of the subset is activated, the charger activated prior to a second charger of the subset and configured to operate at the individual power capacity of the charger.

10. The method of claim 9, comprising:
identifying, by the data processing system, a setting of the configuration; and
validating, by the data processing system responsive to a user selection of the setting, a representation of the configuration to cause the controller to load balance power to the charger of the plurality of chargers in accordance with the setting.

11. The method of claim 9, comprising:
causing, by the data processing system, the controller to prioritize, based on a setting of the configuration selected by a user, a power of the charger of the plurality of chargers over a power of a second charger of the plurality of chargers based on the charger activated prior to activation of the second charger.

12. The method of claim 9, comprising:
receiving, by the data processing system via the graphical user interface, an input comprising a user selection of a setting of the configuration; and
causing, by the data processing system, the controller to deliver, based on the setting, an amount of power the charger of the plurality of chargers that corresponds to an amount of power that is delivered by a second controller to a second charger of the plurality of chargers in accordance with the power capacity of the electrical panel, the power capacity of the electrical panel corresponding to a power capacity of the first line and the second line.

13. The method of claim 9, comprising:
causing, by the data processing system, the controller to deliver power to the charger of the subset of the plurality of chargers in accordance with an individual capacity of each of the subset of the plurality of chargers, wherein the power capacity of the electrical panel corresponds to a power capacity of the first line and the second line and the sum of the individual capacities of the subset of the plurality of chargers does not exceed the power capacity of the first line and the second line.

14. The method of claim 9, comprising:
causing, by the data processing system to identify, via a site level view of the graphical user interface, the subset of the plurality of chargers comprising the charger, each of the chargers of the subset having an individual power capacity and configured to exchange power with an electric vehicle, the sum of the individual power capacities of the subset greater than the power capacity of the electrical panel; and
causing, by the data processing system, the controller to deliver power to the charger that corresponds to the power delivered across each of chargers of the subset of the chargers in accordance with an offset from the power capacity of the electrical panel.

15. The method of claim 9, comprising:
causing, by the data processing system, to identify, via a site level view of the graphical user interface, the subset of the plurality of chargers comprising the charger, each of the chargers of the subset configured to exchange power with an electric vehicle and having an individual power capacity, the sum of the individual power capacities of each of the chargers of the subset greater than the power capacity of the electrical panel.

16. The method of claim 9, comprising:
causing, by the data processing system, the controller to distribute to the charger of a subset of the plurality of chargers in accordance with the power capacity of the electrical panel;
causing, by the data processing system, the controller to detect an electric vehicle coupled with the charger, the charger coupled with the first line and the second line; and
causing, by the data processing system, responsive to the detection of the electric vehicle, the controller to redistribute power across the subset of the plurality of chargers in accordance with the power capacity of the first line and the second line.

17. A non-transitory computer-readable medium having processor readable instructions, such that, when executed, causes a processor to
identify a configuration indicating a power capacity of an electrical panel and a plurality of chargers coupled with a first line of the electrical panel to conduct power at a first phase and a second line of the electrical panel to conduct power at a second phase different than the first phase;
present, for display via a graphical user interface, the configuration identifying a sum of individual power capacities of a subset of the plurality of chargers exceeding the power capacity of the electrical panel;
cause, based on the configuration and operational characteristics associated with one or more of the plurality of chargers, a controller to deliver power to a charger of the plurality of chargers via the first line and the second line based on the power capacity of the electrical panel; and cause power to be delivered to the charger of the subset of the Plurality of chargers in accordance with an order in which the charger of the subset is activated, the charger of the subset configured to be activated prior to a second charger of the subset and to operate at the individual power capacity of the charger.

18. The non-transitory computer readable medium of claim 17, wherein the processor is configured to:

identify a setting of the configuration; and validate, responsive to a user selection of the setting, a representation of the configuration to cause the controller to deliver power to the charger of the plurality of chargers in accordance with the power capacity of the electrical panel corresponding to a power capacity of the first line and the second line and in accordance with the setting.

19. The non-transitory computer readable medium of claim 17, wherein the processor is configured to:

cause the controller to prioritize, based on a setting of the configuration selected by a user, a power of the charger of the plurality of chargers over a power provided to a second charger of the plurality of chargers based on the charger activated prior to activation of the second charger.

20. The non-transitory computer readable medium of claim 17, wherein the processor is configured to:

receive, via the graphical user interface, an input comprising a user selection of a setting of the configuration; and cause the controller to deliver, based on the setting, an amount of power to the charger that corresponds to an amount of power that is delivered to a second charger of the plurality of chargers in accordance with the power capacity of the electrical panel, the power capacity of the electrical panel corresponding to a power capacity of the first line and the second line.

* * * * *